(12) United States Patent
Bahr

(10) Patent No.: US 11,077,578 B2
(45) Date of Patent: Aug. 3, 2021

(54) SYSTEM AND METHOD FOR FACILITATING REMOVAL OF TRAPPED TOOL FROM COMPOSITE STRUCTURE

(71) Applicant: SPIRIT AEROSYSTEMS, INC., Wichita, KS (US)

(72) Inventor: Rodney Eugene Bahr, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 407 days.

(21) Appl. No.: 16/100,413

(22) Filed: Aug. 10, 2018

(65) Prior Publication Data

US 2020/0047870 A1 Feb. 13, 2020

(51) Int. Cl.
| | |
|---|---|
| *B23Q 9/00* | (2006.01) |
| *F16B 7/02* | (2006.01) |
| *F16B 7/04* | (2006.01) |
| *B27F 1/14* | (2006.01) |
| *B27F 5/02* | (2006.01) |
| *F16B 11/00* | (2006.01) |
| *B64C 1/14* | (2006.01) |
| *F16B 1/00* | (2006.01) |
| *B29L 31/00* | (2006.01) |
| *B64F 5/10* | (2017.01) |
| *B64C 1/06* | (2006.01) |

(52) U.S. Cl.
CPC ............. *B27F 1/14* (2013.01); *B23Q 9/0014* (2013.01); *B23Q 9/0042* (2013.01); *B27F 5/026* (2013.01); *F16B 7/02* (2013.01); *F16B 7/0426* (2013.01); *F16B 11/008* (2013.01); *B23Q 9/00* (2013.01); *B29L 2031/005* (2013.01); *B64C 1/1492* (2013.01); *B64F 5/10* (2017.01); *F16B 7/0413* (2013.01); *F16B 2001/0092* (2013.01)

(58) Field of Classification Search
USPC .......................... 156/711, 712, 272.4, 274.4
See application file for complete search history.

(56) References Cited

U.S. PATENT DOCUMENTS

2015/0328877 A1* 11/2015 Shome .............. B29C 66/91411
156/64
2019/0315069 A1* 10/2019 Rametsteiner ...... B29C 65/3676

* cited by examiner

*Primary Examiner* — Tyrone V Hall, Jr.
*Assistant Examiner* — Abbie E Quann
(74) *Attorney, Agent, or Firm* — Hovey Williams LLP

(57) ABSTRACT

A system and method for constructing a composite structure using a multi-piece tool. The pieces are assembled, including making a connection, such as a mortise-and-tenon connection, between pieces using an adhesive mixed with an induction heatable material, such as iron filings having a unit size of between 5 microns and 600 microns, and an amount of between 5% and 50% by volume. Plies of a material are applied around the connection between the pieces, and the plies are cured to create the composite structure, which results in the pieces being trapped within the composite structure by the connection. The adhesive is exposed to electromagnetic induction from an electromagnetic induction coil which generates heat in the induction heatable material and thereby loosens the connection. The tool can then be disassembled by individually pulling at least some of the pieces from within the composite structure.

19 Claims, 7 Drawing Sheets

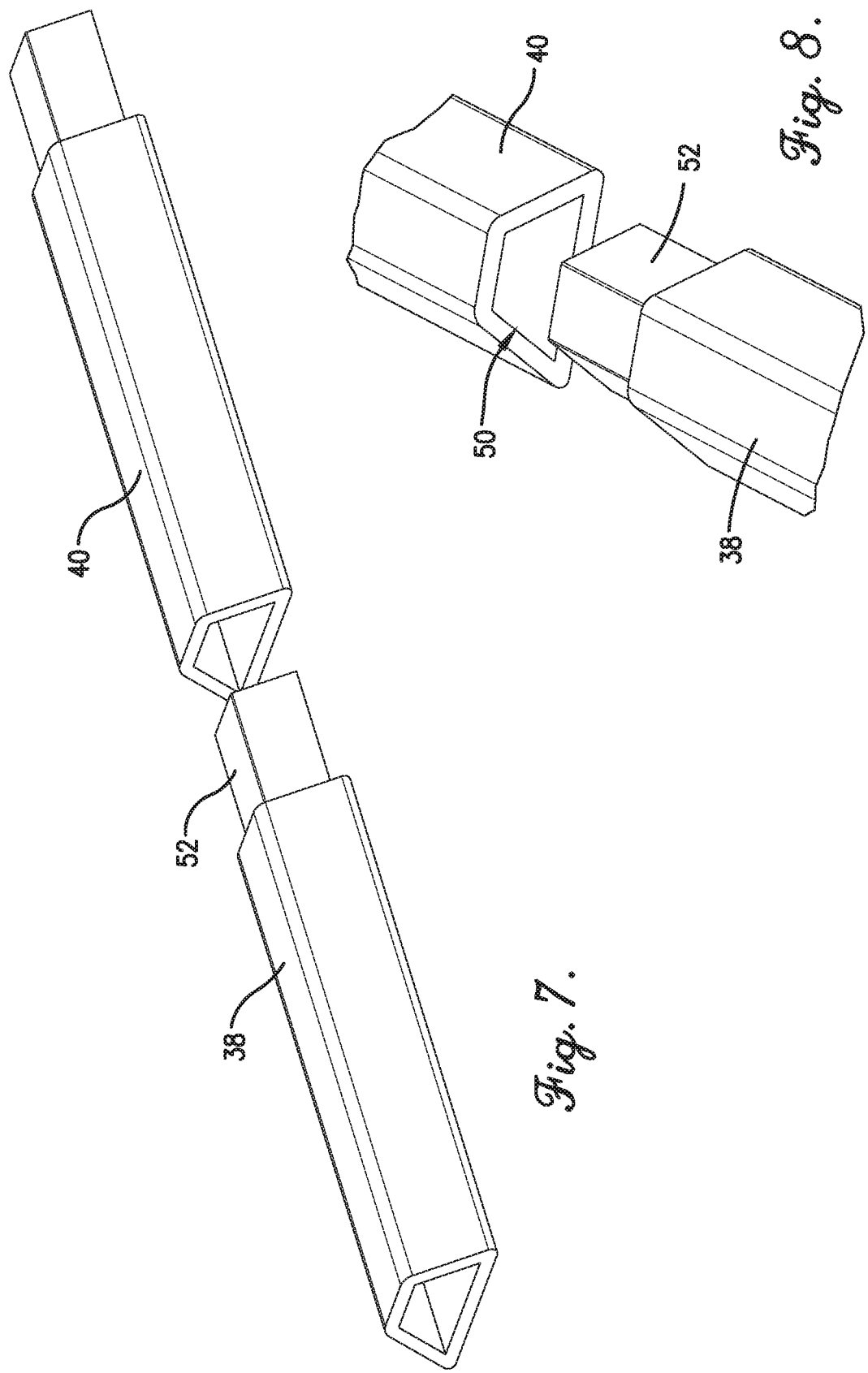

SYSTEM AND METHOD FOR FACILITATING REMOVAL OF TRAPPED TOOL FROM COMPOSITE STRUCTURE

FIELD

The present invention relates to systems and methods for constructing composite structures, and more particularly, embodiments provide a system and method for facilitating the removal of a tool trapped during construction of a composite structure from within the composite structure.

BACKGROUND

Certain composite structures, such as aircraft canopy frames, incorporate a weight optimized, hollow tubular frame with monolithic intersections of individual posts and sills. Ply drops and adds on the inside surface of the posts and sills can result in the bladder, mandrel, or other tool becoming trapped during construction. In general, this may mean that the tool is very difficult and time-consuming to remove after autoclave curing of the composite part containing the tool. For example, some such structures are currently manufactured using an expanding foam mandrel in an extremely tedious process which can require months to build a single chipset. Currently, there is no relief from this time-consuming process.

This background discussion is intended to provide information related to the present invention which is not necessarily prior art.

SUMMARY

Embodiments address the above-described and other problems and limitations by providing a system and method for facilitating the removal of a tool trapped during construction of a composite structure from within the composite structure. Embodiments provide competitive advantages over prior art part designs and construction processes by facilitating the quicker and easier removal of the tool from within the cured composite part, which allows the part to be better designed for optimal weight and increases the speed of the production process.

In a first embodiment, a method is provided for constructing a composite structure using a tool having a plurality of pieces. Broadly, the method may include the following. The plurality of pieces of the tool may be assembled, including making a connection between two or more pieces of the plurality of pieces using an adhesive mixed with an induction heatable material. One or more plies of a material may be applied around the connection between the two or more pieces. The one or more plies of the material may be cured to create the composite structure, such that the two or more pieces are trapped within the composite structure by the connection. The adhesive at the connection may be exposed to an electromagnetic induction in order to generate heat in the induction heatable material and thereby loosen the connection between the two or more pieces. Each of the two or more pieces may be removed by pulling them individually from within the composite structure.

In a second embodiment, a system is provided for constructing a composite structure using a tool. The system may include a plurality of pieces of the tool, an adhesive mixed with an induction heatable material, and an electromagnetic induction coil. The plurality of pieces may be assembled to form the tool, including making a connection between two or more pieces of the plurality of pieces. An adhesive may be mixed with an induction heatable material and applied to the connection between the two or more pieces, wherein one or more plies of a material are applied around the connection between the two or more pieces, and the one or more plies of the material are cured to create the composite structure, such that the two or more pieces are trapped within the composite structure by the connection. An electromagnetic induction coil may expose the adhesive at the connection to an electromagnetic induction in order to generate heat in the induction heatable material and thereby loosen the connection between the two or more pieces, wherein the each of the two or more pieces are individually removed by pulling from within the composite structure.

Various implementations of the foregoing embodiments may include any one or more of the following features. The composite structure may be part of an aircraft. The pieces may include an elastomeric bladder, and after curing the one or more plies, the elastomeric bladder may be deflated to separate the tool from the one or more plies. The elastomeric bladder may include one or more weak areas to facilitate collapsing the elastomeric bladder during deflation. The induction heatable material may be in the form of iron filings, or may be aluminum, stainless steel, carbon fiber, doped plastic, doped insulators, and combinations thereof. The induction heatable material may be in the form of a plurality of distinct particles, a mesh, or a solid piece. The connection between the two or more pieces of the tool may be a mortise-and-tenon connection. The mortise-and-tenon connection may include a radius molded into an end of at least one of the two or more pieces, wherein the radius collapses when the at least one of the two or more pieces is pulled from within the composite structure.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 7 is an isometric view of an example implementation of the first and second pieces;

FIG. 8 is a fragmentary perspective view of mortise and tenon elements of the first and second pieces of FIG. 7;

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments concern a system and method for facilitating the removal of a tool trapped during construction of a composite structure from within the composite structure. Embodiments advantageously provide a competitive advantage over prior art part designs and construction processes by facilitating the quicker and easier removal of a bladder, mandrel, or other tool from a cured composite part, which allows the part to be better designed for optimal weight and increases the speed of the production process.

By way of illustration and not limitation, the present technology will be described in the context of constructing an example canopy frame structure for an aircraft. However, the present technology may be adapted for use in the construction of substantially any composite structure (part of, e.g., a bicycle, tennis racket, hockey stick) which could benefit from a minimum weight design using ply drops and adds on the interior of the structure to provide a constant grip or a smooth non-varying outer surface. Achieving a constant surface forces the ply variation to the interior of the part where the tool used to construct the part can become trapped, and the present technology advantageously ameliorates this problem.

Figure 1:
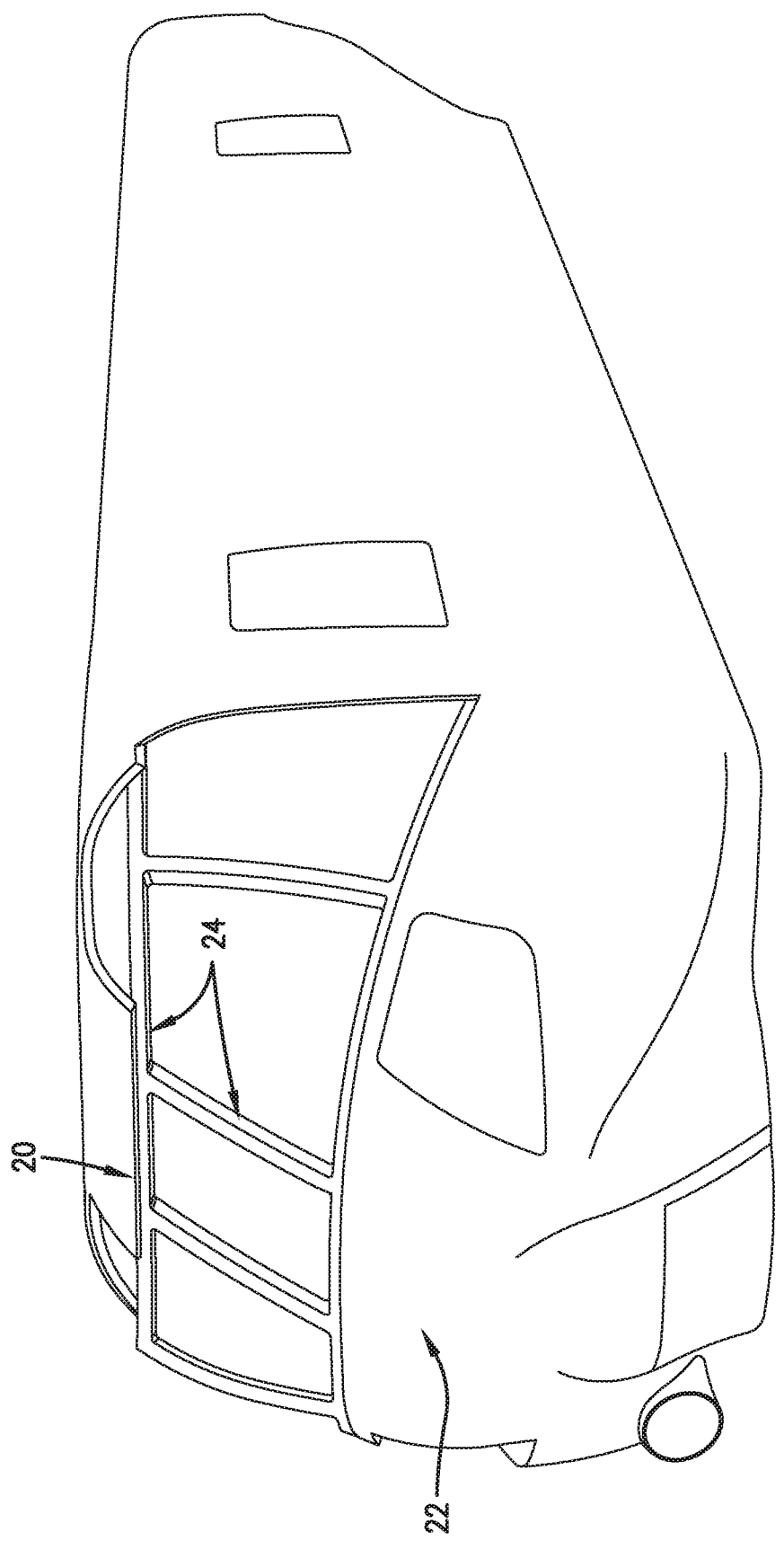
FIG. 1 is a perspective view of an example canopy frame composite structure which may be constructed using an embodiment of the present technology.
Figure 2:
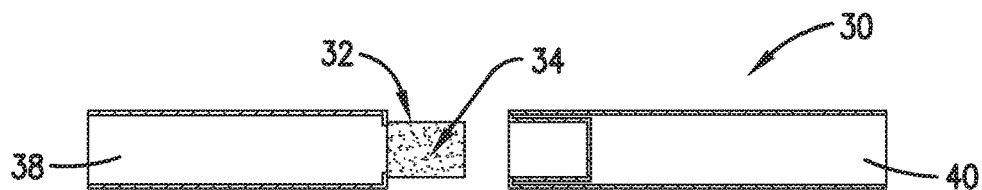
FIG. 2 is a cross-sectional side elevation view of first and second pieces of a tool for constructing a composite structure, such as the example canopy frame of FIG. 1.
Figure 3:
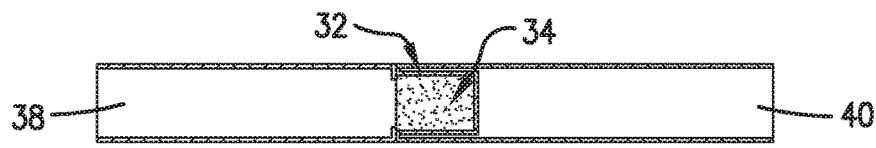
FIG. 3 is a cross-sectional side elevation view of the first and second pieces assembled to form the tool, including a connection between the pieces using an adhesive mixed with an induction heatable material.

Referring to FIG. 1, the example canopy frame 20 of the aircraft 22 may include intersecting curved hollow tubes 24 with varying cross-sections. The canopy frame 20 may be optimized for minimum weight, and may therefore have ply drops and adds both on the interior and exterior surfaces of the tubes 24. While the ply drops and adds on the exterior may add no significant complexity, the ply drops and adds on the interior may result in the tool used to construct the tubes 24 becoming trapped once the composite structure that is the canopy frame 20 is cured.

Referring to FIGS. 2-6, a system is shown for facilitating the removal of a tool trapped during construction of a composite structure, such as the example canopy frame 20, from within the composite structure. The system may broadly comprise a plurality of pieces 30 of the tool, an adhesive 32 mixed with an induction heatable material 34, and an electromagnetic induction coil 36. The plurality of pieces 30 may be assembled to form the tool, including making a connection between two or more pieces 38, 40 of the plurality of pieces 30. In one implementation, one or both pieces 38, 40 may be or may include elastomeric bladders which are collapsible and expandable as desired or needed to facilitate the construction and subsequent removal processes. The adhesive 32 which may be mixed, or "doped," with the induction heatable material 34 may be applied to the connection between the pieces 38, 40. The adhesive 32 may be a room-temperature-vulcanizing (RTV) silicon adhesive/sealant, a polysulphide sealant, or other flexible and otherwise suitable adhesive. The induction heatable material 34 may take the form of iron filings which are mixed with the adhesive 32 prior to applying the adhesive 32 to and assembling the pieces 38, 40. The size and amount (i.e. mix ratio) of the iron filings may depend on the particular application, but for many applications the size may be approximately between 5 microns and 600 microns, and the amount may be between 5% and 50% by volume with the adhesive.

It will be appreciated that the material to be heated by the electromagnetic induction coil need not be ferromagnetic, but may instead be substantially any electrically conductive material which is amenable to heating by electrical induction. Thus, alternative embodiments may employ, for example, aluminum, stainless steel, carbon fiber, or doped plastic or other doped insulators, or combinations of such materials, the broad category of which is referred to herein as "induction heatable" materials—i.e., materials that are heatable by electromagnetic induction. In some applications, it may be desirable to select the material based at least in part on the frequency at which induction heating occurs, so as to avoid heating adjacent materials which may also be amenable to induction heating but at a different frequency.

The induction heatable material may have substantially any suitable shape and form, including a plurality of distinct (e.g., generally spherical) particles, a screen or other mesh, or a solid piece (e.g., a sheet of foil having a thickness of approximately between 1 mil and 3 mils). In one implementation, the adhesive may be applied to an end of the piece 38, 40, and a screen or mesh of the induction heatable material may be wrapped around the end of the piece 38, 40, such that some of the adhesive is squeezed through the screen or mesh.

Once the pieces 38, 40 are assembled and the adhesive 32 is cured, one or more plies 42 of a composite material may be applied around the pieces 38, 40, including the connection between the pieces 38, 40. The plies 42 may then be cured to create the composite structure, such that the pieces 38, 40 may be trapped within the composite structure by the connection.

The electromagnetic induction coil 36 may expose the adhesive 32 at the connection to an electromagnetic induction in order to generate heat in the induction heatable material 34 and thereby sufficiently weaken the bond line of the cured adhesive and loosen the connection between the pieces 38, 40. The power and shape of the induction coil 36, as well as the minimum, maximum, and optimum heat transfer times may depend on the particular application. One consideration in determining the heat transfer times for a particular application may be the amount of heat, if any, generated in and/or transferred to the carbon fibers or other fibers in the composite part. For example, in one implementation which employs a silicon adhesive it may be desirable to reach 500 degrees F. as quickly as practical in order to degrade the bond line without damaging the adjacent plies or other structure. Each of the pieces 38, 40 may then be individually removed by pulling from within the composite structure.

If one or both of the pieces 38, 40 are or include an elastomeric bladder, the bladder may be inflated before or after applying the plies 42 to the pieces 38, 40 to assist in supporting and/or compacting the plies 42. After curing the plies 42, the bladder may be deflated (by, e.g., applying a vacuum to the bladder) to separate the pieces 38, 40 from the inner sidewalls of the cured plies 42. In one implementation, the bladder may include one or more grooves or other weak areas 44 (seen in FIG. 11) in its wall or other structure to facilitate collapsing the bladder during deflation. Electromagnetic induction may be used to heat the bondline, and the freed pieces 38, 40 may be pulled from within the composite structure.

Figure 9:
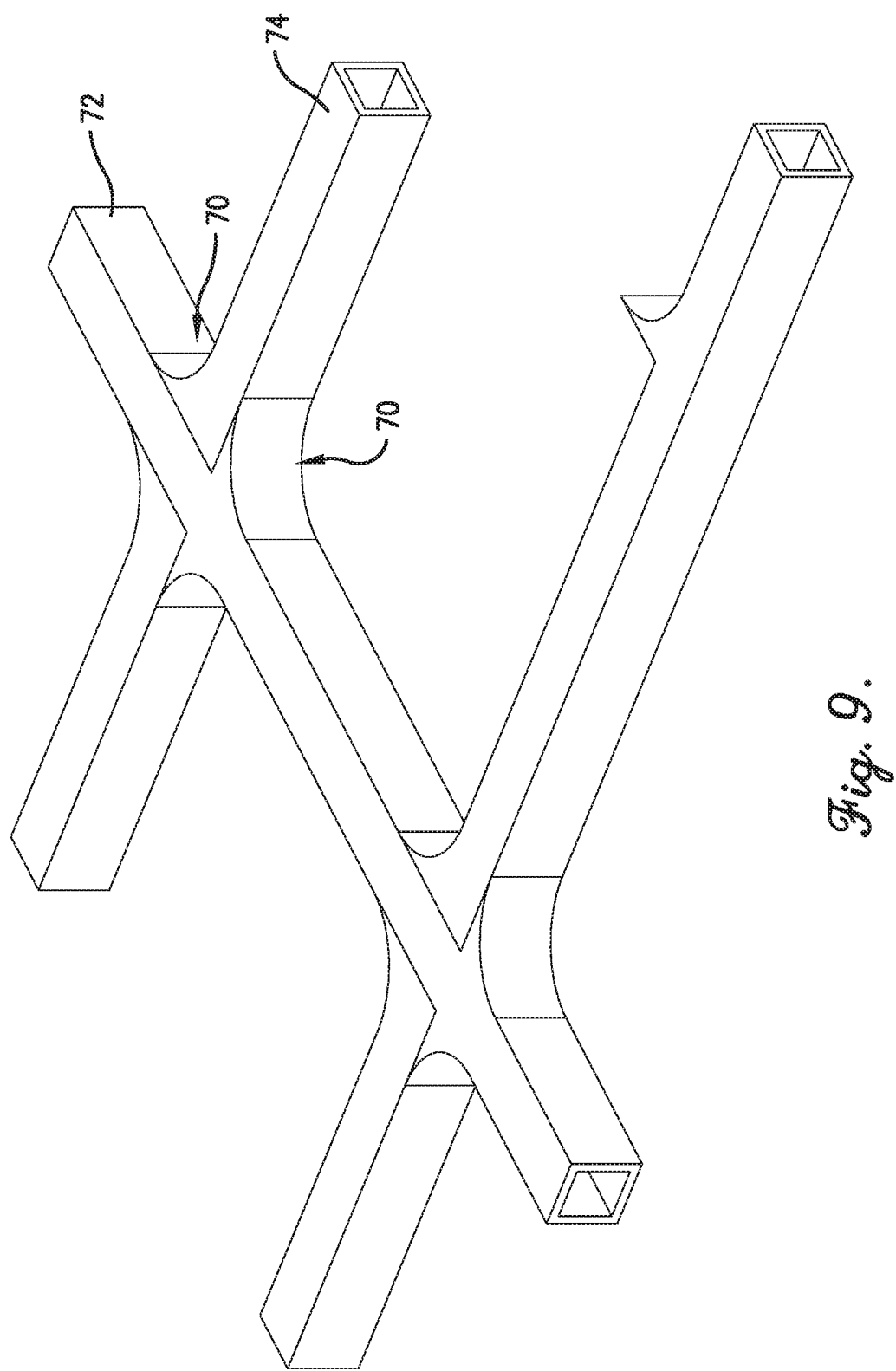
FIG. 9 is an isometric view of a modified mortise and tenon connection at an intersection of pieces of the tool.

Example pieces 38, 40 are shown in FIG. 7. Referring to FIG. 8, in one implementation, one of the pieces 38 may include a mortise element 50, and the other piece 40 may include a tenon element 52, such that the connection may be a mortise-and-tenon connection. In one implementation, the tenon 52 may be an integrally or separately cast piece designed to fit inside the mortise 50 of the other piece, and thereby better facilitate large complex assemblies. Referring also to FIG. 9, in one implementation, a modified mortise-and-tenon connection may be used which may include an additional radius 70 molded into some or all of the pieces 72, 74. These radii 70 may reduce or eliminate the need for a multi-piece molded intersection assembly. In particular, the crosspiece 72 may pass completely through the intersection, and the mating piece 74 may terminate at the crosspiece 72. The additional radii 70 molded onto the pieces 72, 74 may serve to completely fill the composite part, and the radii tabs may be sufficiently flexible or otherwise designed so as to collapse into the cured tube when pulled in the correct direction to remove the pieces 72, 74.

Figure 10:
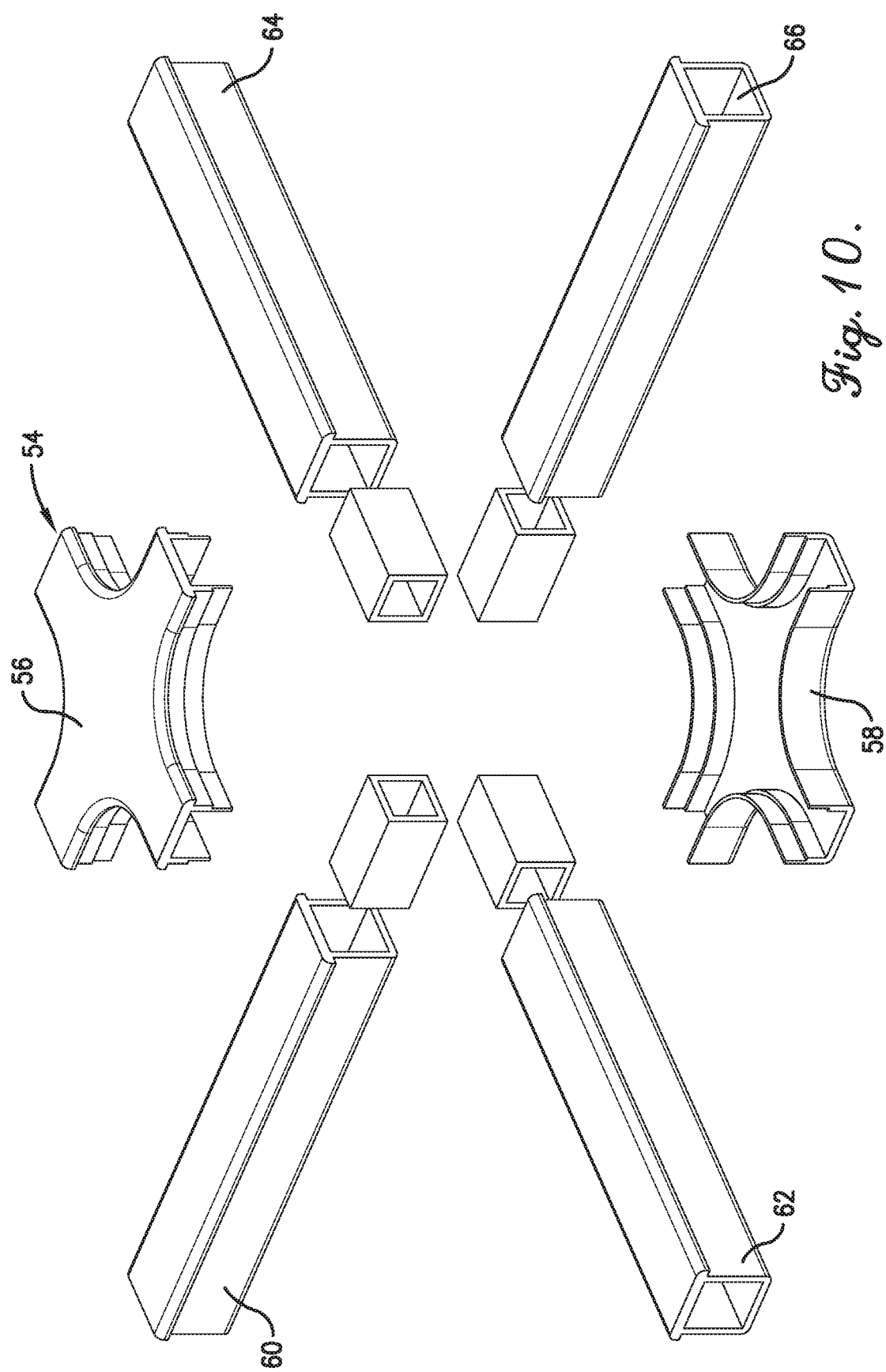
FIG. 10 is an exploded isometric view of an example intersection hub for pieces of the tool.

Referring also to FIG. 10, in one implementation, an intersection hub 54 of the tool may be designed with an upper hub section 56 and a lower hub section 58, which may mate together using a rebate joint, and which facilitate connecting several pieces 60, 62, 64, 66 of the plurality of pieces 30.

Figure 11:
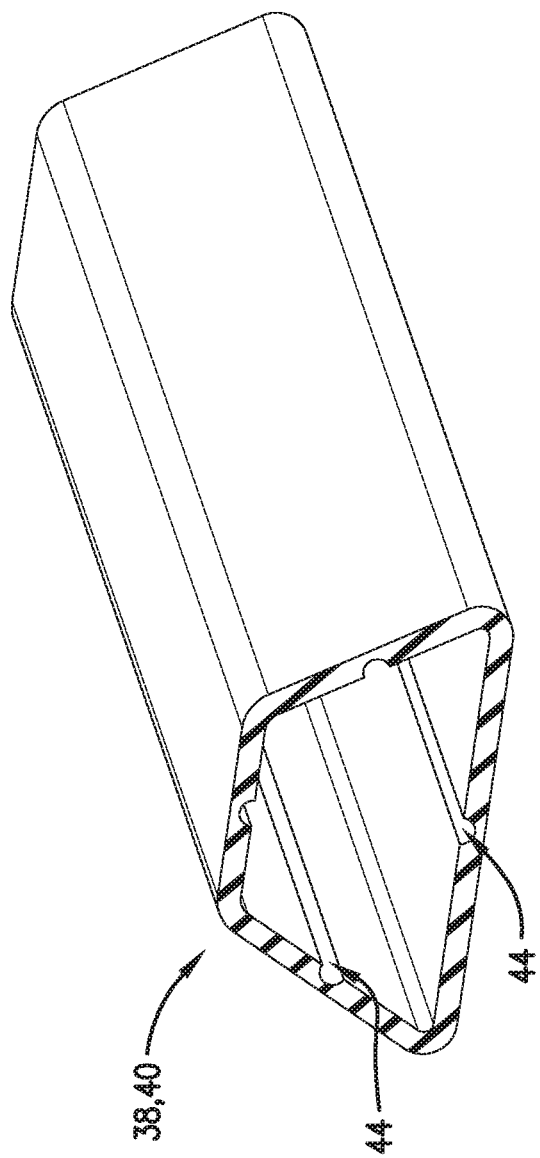
FIG. 11 is a fragmentary isometric view of an elastomeric bladder component of the tool having one or more weak areas to facilitate collapsing the elastomeric bladder during deflation.

As mentioned, referring to FIG. 11, in one implementation one or both of the pieces 38, 40 may be or may include an elastomeric bladder. The bladder may be inflated before or after applying the plies 42 to the pieces 38, 40 to assist in supporting and/or compacting the plies 42. After curing the plies 42, the bladder may be deflated (by, e.g., applying a vacuum to the bladder) to separate the pieces 38, 40 from the inner sidewalls of the cured plies 42. In one implementation, the bladder may include one or more grooves or other weak areas 44 in its wall or other structure to facilitate collapsing the bladder during deflation. Electromagnetic induction may be used to heat the bondline, and the freed pieces 38, 40 may be pulled from within the composite structure.

Figure 12:
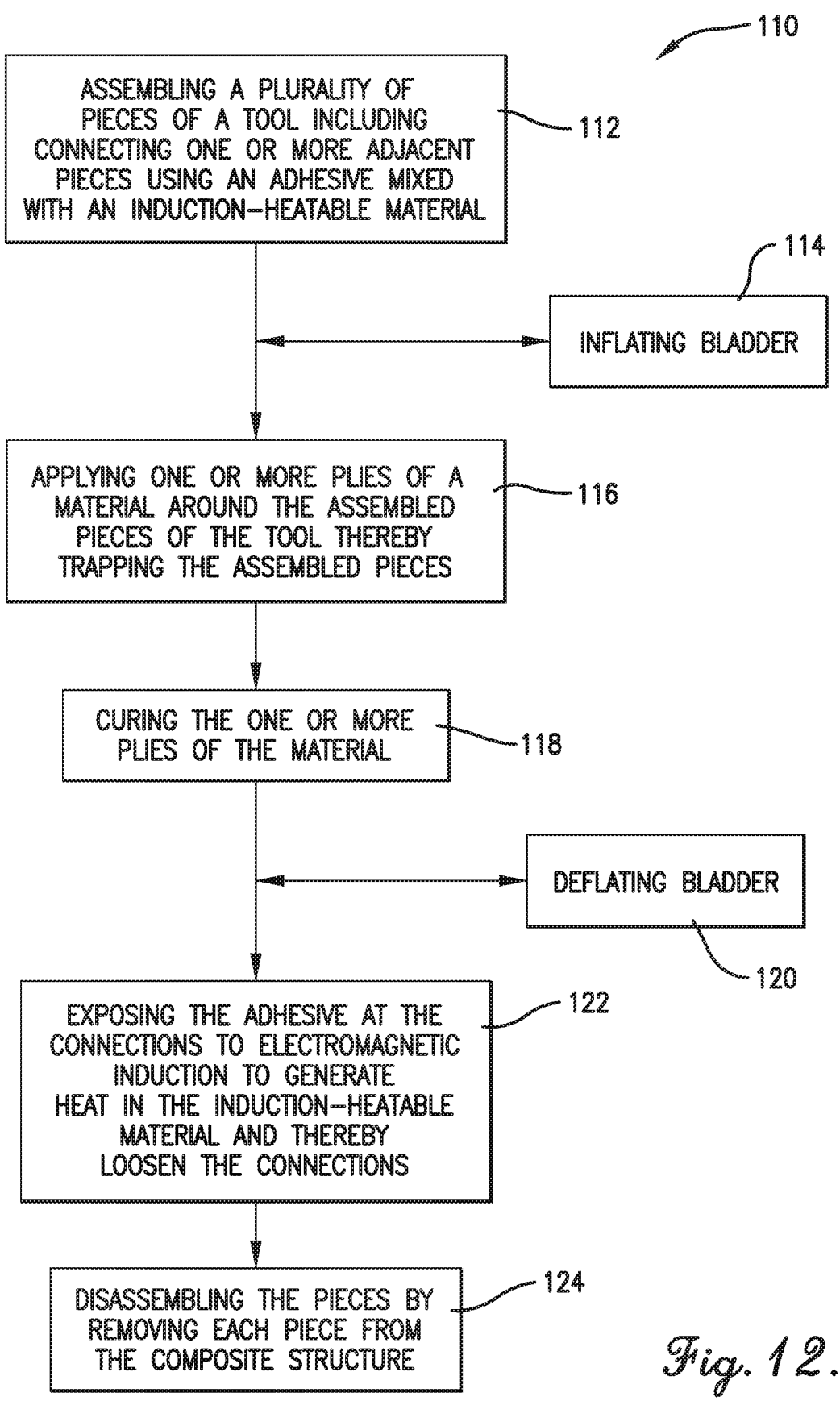
FIG. 12 is a flowchart of steps involved in a method for facilitating the removal of a tool trapped during construction of a composite structure from within the composite structure.

Referring to FIG. 12, a flowchart of an embodiment of a method 110 is shown for constructing a composite structure and facilitating the removal of a tool trapped during construction within the composite structure. The steps of the method may correlate with the functionality of the system described above. In one implementation, the composite structure may be part of an aircraft. The plurality of pieces of the tool may be assembled, including making a connection between two or more adjacent pieces using an adhesive mixed with an induction heatable material, as shown in 112 and illustrated in FIG. 3. The connection between the two or more pieces may be a mortise-and-tenon connection, as illustrated in FIG. 8. In one implementation, the mortise-and-tenon connection may include an additional radius molded into at least one of the pieces, wherein a first piece passes completely through an intersection, and a second piece intersects with and terminates at the first piece, and the additional radius completely fills the composite part, and the radius collapses into the cured tube upon being pulled in the correct direction, as illustrated in FIG. 9. In one implementation, assembling the plurality of pieces of the tool may include creating an intersection hub by making a rebate connection between an upper hub piece and a lower hub piece, as illustrated in FIG. 10. The induction heatable material may take the form of iron filings. The unit size and the amount of the induction heatable material may depend on the nature of the material. In one implementation, in which the induction heatable material is iron filings, the induction heatable material may have a unit size of approximately between 5 microns and 600 microns, and an amount of approximately between 5% and 50% by volume—i.e., a ratio the induction heatable material to the adhesive of approximately between 1:19 and 1:1. If one or both of the pieces 38, 40 are or include an elastomeric bladder, the bladder may be pressurized or otherwise inflated, as shown in 114.

Figure 4:
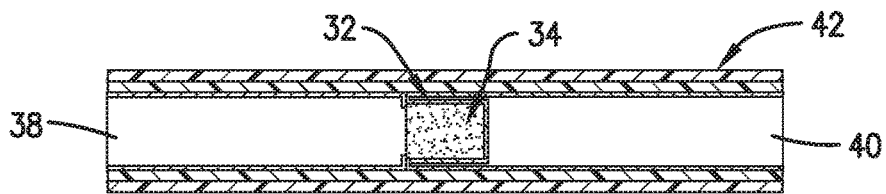
FIG. 4 is a cross-sectional side elevation view showing plies laid over the first and second pieces to create the composite structure.

One or more plies of a material may be applied around the connection between the two or more pieces, as shown in 116 and illustrated in FIG. 4. The one or more plies 42 of the material may be cured to create the composite structure, as shown in 118, such that the two or more pieces are trapped within the composite structure by the connection.

After curing the plies 42, if one or both of the pieces 38, 40 are or include a bladder, the bladder may be depressurized or otherwise deflated (by, e.g., applying a vacuum to the bladder) to separate the pieces 38, 40 from the inner sidewalls of the cured plies 42, as shown in 120.

Figure 5:
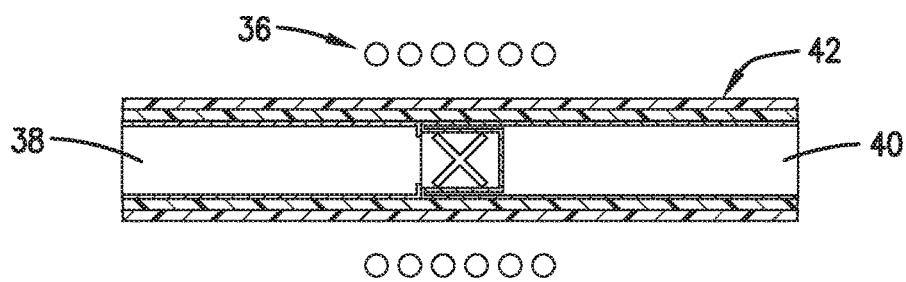
FIG. 5 is a cross-sectional side elevation view showing the first and second pieces being exposed to an electromagnetic induction to loosen the connection.
Figure 6:
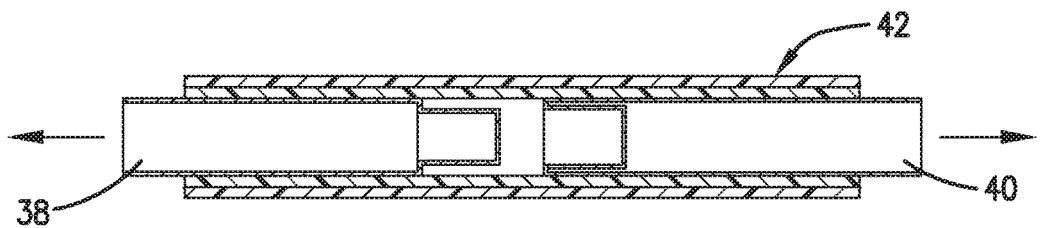
FIG. 6 is a cross-sectional side elevation view of the first and second pieces being removed by pulling from within the composite structure.

The adhesive at the connection may be exposed to electromagnetic induction in order to generate heat in the induction heatable material and thereby loosen the connection between the two or more pieces, as shown in 122 and illustrated in FIG. 5. The plurality of pieces may be disassembled by pulling or otherwise removing each piece individually from within composite structure, as shown in 124 and illustrated in FIG. 6.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A method for constructing a composite structure using a tool having a plurality of pieces, the method comprising:
    assembling the plurality of pieces of the tool, including
        making a connection between two or more pieces of the plurality of pieces using an adhesive mixed with an induction heatable material;

applying one or more plies of a material around the connection between the two or more pieces;

curing the one or more plies of the material to create the composite structure, such that the two or more pieces are trapped within the composite structure by the connection;

exposing the adhesive at the connection to an electromagnetic induction in order to generate heat in the induction heatable material and thereby loosen the connection between the two or more pieces; and removing by pulling each of the two or more pieces individually from within the composite structure.

2. The method of claim 1, wherein the composite structure is part of an aircraft.

3. The method of claim 1, wherein the two or more includes an elastomeric bladder, and after curing the one or more plies, the elastomeric bladder is deflated to separate the two or more pieces from the one or more plies.

4. The method of claim 3, wherein the elastomeric bladder includes one or more weak areas to facilitate collapsing the elastomeric bladder during deflation.

5. The method of claim 1, wherein the induction heatable material is in the form of iron filings.

6. The method of claim 1, wherein the induction heatable material is selected from the group consisting of: aluminum, stainless steel, carbon fiber, doped plastic, doped electrical insulators, and combinations thereof.

7. The method of claim 1, wherein the induction heatable material is in the form of a plurality of distinct particles.

8. The method of claim 1, wherein the induction heatable material is in the form of a mesh.

9. The method of claim 1, wherein the induction heatable material is in the form of a solid piece.

10. The method of claim 1, wherein the connection between the two or more pieces of the tool is a mortise-and-tenon connection.

11. The method of claim 10, wherein the mortise-and-tenon connection includes a radius molded into an end of at least one of the two or more pieces, and wherein the radius collapses when the at least one of the two or more pieces is pulled from within the composite structure.

12. A system for constructing a composite structure using a tool, the system comprising:

a plurality of pieces assembled to form the tool, including making a connection between two or more pieces of the plurality of pieces;

an adhesive mixed with an induction heatable material and applied to the connection between the two or more pieces, wherein one or more plies of a material are applied around the connection between the two or more pieces, and the one or more plies of the material are cured to create the composite structure, such that the two or more pieces are trapped within the composite structure by the connection; and an electromagnetic induction coil exposing the adhesive at the connection to an electromagnetic induction in order to generate heat in the induction heatable material and thereby loosen the connection between the two or more pieces, wherein the each of the two or more pieces are individually removed by pulling from within the composite structure.

13. The system of claim 12, wherein the induction heatable material is in the form of iron filings.

14. The method of claim 12, wherein the induction heatable material is selected from the group consisting of: aluminum, stainless steel, carbon fiber, doped plastic, doped electrical insulators, and combinations thereof.

15. The method of claim 12, wherein the induction heatable material is in the form of a plurality of distinct particles.

16. The method of claim 12, wherein the induction heatable material is in the form of a mesh.

17. The method of claim 12, wherein the induction heatable material is in the form of a solid piece.

18. The system of claim 12, wherein the connection between the two or more pieces of the tool is a mortise-and-tenon connection.

19. The method of claim 12, wherein the two or more pieces include an elastomeric bladder, and the elastomeric bladder includes one or more weak areas to facilitate collapsing the elastomeric bladder during deflation of the elastomeric bladder to separate the elastomeric bladder from the one or more plies during removal of the two or more pieces.

* * * * *